United States Patent Office 2,929,932
Patented Mar. 22, 1960

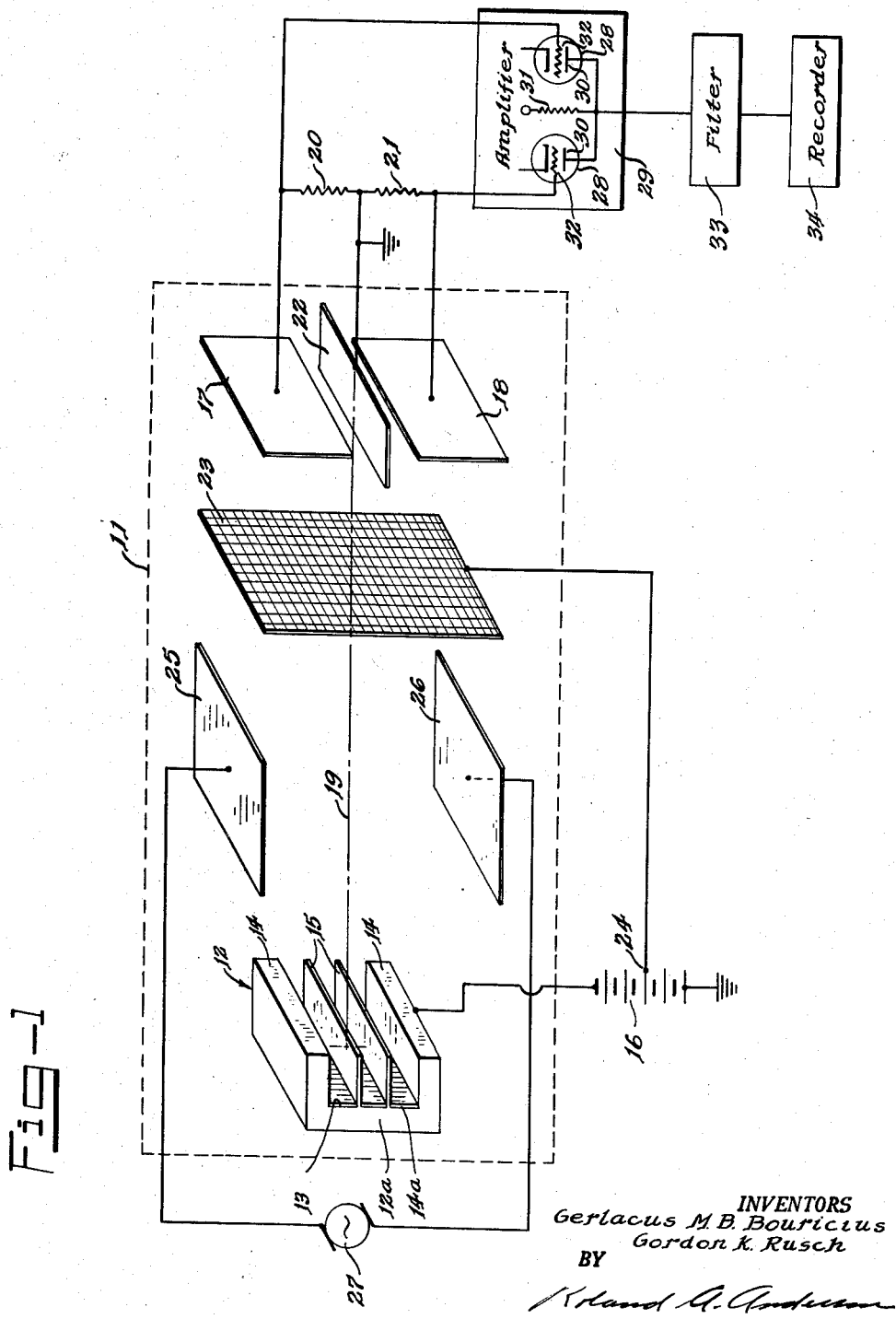

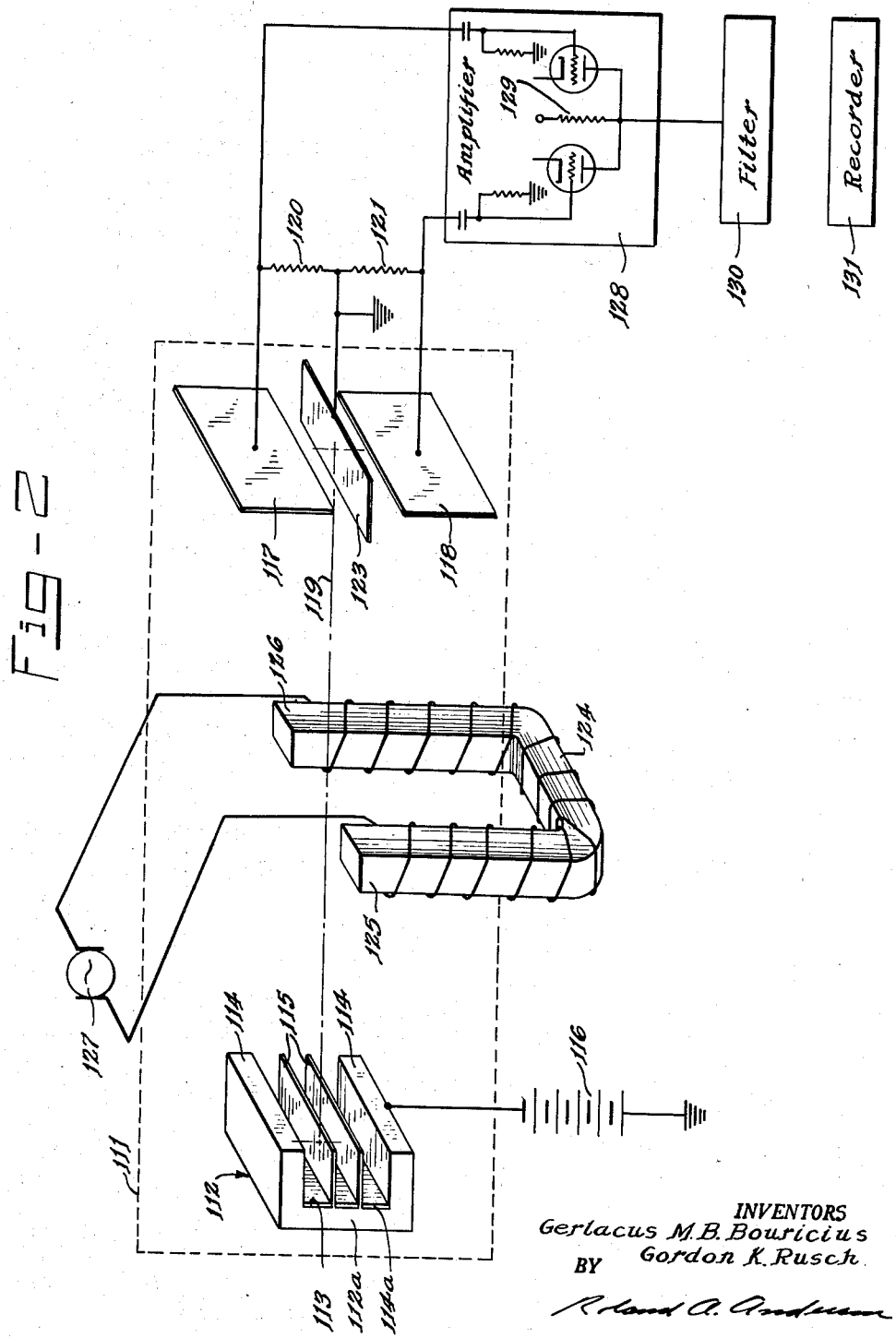

2,929,932

RADIATION MEASURING DEVICES

Gerlacus M. B. Bouricius, Greenhills, and Gordon K. Rusch, Dillonvale, Ohio, assignors to the United States of America as represented by the United States Atomic Energy Commission Application April 23, 1957, Serial No. 654,624

9 Claims. (Cl. 250—83.1)

This invention relates to devices for measuring radiation and more particularly to ionization chambers.

Ionization chambers, as they are generally known in the radiation measurement field today, provide difficulties in the measurement of the magnitude of radiation fluxes because of their direct current output. The majority of ionization chambers in use today consist of a plurality of parallel plates enclosed in a gas-tight shell, the plates having a steady direct potential applied thereto. Radiation or particles introduced into the ionization chamber will cause the gas to ionize. The potential gradient between the plates will cause the electrons, ions and charged gas particles to be attracted towards the plates producing a flow of electric current. Because of the relatively minute magnitude of the direct current signals produced, it becomes necessary to amplify the signals to make them useful for measurement or control purposes. Rather than amplifying these relatively weak direct current signals, it is generally preferable to mechanically or electronically convert the direct current signals into alternating current signals. Vibrating reed and dynamic condenser converters have been developed to convert direct currents to alternating currents mechanically while frequency modulation circuits have been designed to accomplish this purpose electronically. These means, however, are external to the ionization chamber and necessitate additional expensive components. It is one of the objects of the present invention to provide a novel ionization chamber which directly produces an alternating current signal.

The inventive device herein disclosed comprises a housing containing an ionizable gas. A high energy particle source responsive to the presence of a radiation flux is disposed within the housing with a pair of collector plates spaced therefrom. A potential source establishes a gradient between the source and the collector plates causing ionized masses to flow to the plates. By means of electrostatic or magnetic deflection elements connected to an alternating potential the ionized masses are caused to flow periodically to one collector plate and then the other.

Another object of the invention is to provide a highly sensitive device having fast resolving time characteristics by reducing the interelectrode capacities and increasing the signal to noise ratios. A screen is introduced in the embodiment using electrostatic deflection between the collector plates and the deflection means to reduce the interelectrode capacitance therebetween. Since there is no appreciable capacitance between the collector plates and the deflection means in the magnetic deflection embodiment a screen is not necessary. The signal to noise ratio is greatly increased by producing an alternating signal output having a fundamental frequency twice that of the alternating voltage source connected to the deflection means. A band pass filter in the output circuit tuned to the double frequency filters out noise voltages deviating therefrom.

Another object of applicants' invention is to provide a device having no moving parts in order to obtain an alternating current signal output. The substantially direct current flow of the ionized particles in the chamber is alternately deflected to a plurality of collector plates by means of an alternating electrostatic or magnetic field. Mechanical resonance, damping effect and other difficulties incumbent in mechanical converters are not present in the described device.

Further objects and advantages of the present invention will be readily apparent to the man skilled in the art from a further reading of this specification, particularly when viewed in light of the drawings, in which:

Figure 1 is a schematic isometric view of one embodiment of the invention in which the charged particles are deflected by electrostatic means; and Figure 2 is a schematic isometric view showing a second embodiment of applicants' invention wherein magnetic means for deflecting the charged particle beam are used.

To describe more completely one of the preferred embodiments of the invention, reference is made to the neutron sensing apparatus schematically shown in Figure 1 of the drawings. The inner elements (hereinafter described) are housed in a gas-tight container 11 constructed of a neutron permeable material, such as aluminum or other materials having an absorption cross section of 10 barns or less.

Within the container 11 is a gas which is ionizable by the collision of high energy radiation particles with molecules of the gas. It is desirable that the gas have characteristics which permit a low level of recombination of positive and negative ions produced as well as a high mobility factor for the travel of negatively charged particles or ions. The noble gases or polyatomic gases are generally suitable for use in a device of this nature, a particularly suitable medium being argon with 1 to 10% nitrogen in mixture therewith at a pressure of about 1 atmosphere.

Housed at one end of the container 11 is a substantially U-shaped electrically conducting emitter 12 having a central portion 12a and a pair of generally parallel leg portions 14 extending into the container 11. The surface of the central portion 12a included between the leg portions 14, designated 13, is provided with a coating 14a of material which will emit high energy particles upon bombardment by enutrons of thermal energies. A particularly suitable material for the coating 14a is the boron-10 isotope which emits high energy alpha particles when bombarded with thermal neutrons. Beta emitting materials such as indium are also suitable for use as the coating 14a. A plurality of substantially equally spaced plates 15 are connected perpendicularly to the coated surface 13 and parallel to the leg portions 14 of the U-shaped emitter 12. The plates 15 form collimators which will tend to restrict the paths of the alpha and beta particles in planes parallel to the collimators. The emitter 12 is placed at a negative electric potential with respect to ground by means of a voltage source 16.

Disposed at the other end of the container 11 is a pair of plates 17 and 18 equally spaced from and parallel to the coated surface 13 of the emitter 12, and spaced from one another on opposite sides of an imaginary plane (not shown) containing an axial line 19 drawn normally to the coated surface 13 from the midpoint therein, said plane being parallel to collimators 15. The plates 17 and 18 are connected to the positive terminal of the power source 16, which serves as ground potential, through resistors 20 and 21, respectively, thereby establishing a potential gradient between the emitter 12 and the plates 17 and 18. An electrically conducting plate 22 is disposed between the collector plates 17 and 18 and perpendicular thereto within the plane containing the axis 19. The plate 22 is connected to the positive terminal of the power source 16 through ground to separate the signals on each plate 17 and 18 and to reduce the interelectrode capacitances between the plates 17 and 18. A fine-mesh electrically conducting screen 23 is disposed between the emitter 12 and the plates 17 and 18 perpendicular to the axis 19 and placed at a positive potential relative to the emitter 12 and at a negative potential with respect to the collector plates 17 and 18 by a power source formed by a tap 24 on the voltage source 16. A pair of parallel plates 25 and 26 are disposed on opposite sides of and parallel to the plane containing the central axis 19 between the emitter 12 and the screen 23, and are connected to opposite terminals of an alternating voltage source, such as a generator 27, so that their respective polarities will be periodically reversed with respect to the equipment ground potential.

The output of the device is taken across each of the resistors 20 and 21 and transmitted to a pair of vacuum tubes 28 forming the input to an amplifier 29. The vacuum tubes 28 have their respective plates 30 connected together which are connected to a common power supply (not shown) through a common load resistor 31 so that signals appearing on their grids 32 will be algebraically added together across their load resistor 31. The output of amplifier 19 is connected to a filter 33 which is tuned to pass frequencies approximately double the frequency of the alternating voltage source 27. A recorder 34 is connected to the output of the filter 33 and measures the magnitude of the signal passed through the filter 33.

The operation of the nuclear sensor may be described with reference to Figure 1, assuming that the device illustrated therein is physically located within a thermal neutron flux. The neutrons traverse the highly permeable aluminum container 11, some of which strike the coating 14a on the emitter surface 13. High energy particles will be emitted from the coating 14a and will be directed in paths essentially parallel to the collimator plates 15. The travel of the particles through the gaseous mixture in the device will cause the gas to be ionized along the path of travel of each of the particles. Because of the potential gradient between the emitter 12 and the screen 23 and the collector plates 17 and 18, the negatively charged masses, such as electrons, negative ions and charged gas particles are accelerated towards the collector plates 17 and 18. The accelerating potential gradient, however, is periodically altered by the presence of the alternating signal on the deflection plates 25 and 26, so that the negatively charged masses, as they travel toward the screen 23, will be deflected toward plate 25 when a positive voltage appears thereon and will be deflected toward plate 26 when a positive potential appears at a point later in time on plate 26. The frequency of the alternating voltage applied to the deflection plates 25 and 26 is selected with respect to the potential gradient between the emitter 12 and the screen 23 so that the transit time of the negative particles or ions between the emitter 12 and the screen 23 is somewhat less than one-half the period of one cycle of the alternating signal applied to the deflection plates. For a device of relatively small size the frequency of the alternating signal may be of the order of 100 to 1000 cycles per second while the direct current accelerating voltage may be in the region of 100 to 2500 volts, and the distance between the emitter 12 and the screen 23 may be from 1 to 6 centimeters. Because of the great spatial voids in the fine-meshed screen 23, the negatively charged masses will travel through the screen 23 to the respective collector plate 17 or 18, dependent upon the voltage polarity on the deflection plates 25 and 26. Let it first be assumed that in one minute increment of time, corresponding to a first half of a cycle of the alternating current voltage applied to the deflection plates 25 and 26, plate 25 has a positive potential and plate 26 has a negative potential. The negatively charged masses traversing the volume between the two plates will be deflected so that they strike collector plate 17 creating a negative charge thereon. Presence of the negative charge on the collector plate 17 during that minute increment of time will cause a current flow from ground through resistor 20 to the collector plate 17 producing a voltage signal thereacross which will be detected on the grid of one of the vacuum tubes 28. This signal will be amplified as a positive signal across the common load resistor 31. Assuming a second increment of time later than the one first assumed and corresponding to the second half of the same cycle of the alternating voltage applied to the deflection plates 25 and 26, plate 25 now has a negative potential and plate 26 has a positive potential. The negatively charged masses will now be deflected so that they will strike the collector plate 18 creating a negative pulse signal thereon. In this second assumed increment of time the current will flow from ground through resistor 21 to collector plate 18, whereas negligible current will flow through resistor 20 because of the absence of a signal on deflector plate 17. The negative signal across resistor 21 will be transmitted to the other vacuum tube 28 and amplified thereby as a positive signal across the common load resistor 31. Since two positive pulses occur across the load resistor 31 for one polarity shift of the potential applied to the deflection plates 25 and 26, the fundamental frequency of the signal across the load resistor 31 is double that of the applied voltage source 27. The signal is then transmitted to the band pass filter which has been tuned to twice the frequency of the applied alternating voltage which thereby eliminates noise voltages caused by theoretically imperfect shielding of the interelectrode capacitances between the collector plates 17 and 18 and the deflection plates 25 and 26. Since the number of particles emitted from the coating 14a is dependent upon the strength of the neutron flux present, a signal is produced which is a function of the strength of the neutron flux. The magnitude of the signal passed by the filter 33 is measured by the recorder 34 to give an indication of the strength of the neutron flux being measured.

Figure 2 pictures a second embodiment of applicants' invention which differs from the embodiment of Figure 1 in the use of magnetic deflection rather than electrostatic deflection.

The container 111 is similar to the gas-tight aluminum container 11 of the first embodiment and contains a gas having similar characteristics to that discussed for the first embodiment. The emitter 112 is also similar to the emitter 12 of the first embodiment in that it comprises a substantially U-shaped member having a central portion 112a and a pair of generally parallel leg portions 114 extending into the container 111. The surface 113 of the central portion 112a is coated with a material which will emit high energy particles upon bombardment by thermal neutrons, such as the boron-10 isotope, indium or cadmium. A plurality of plates 115 perpendicular to the emitter surface 113 and parallel to the leg portions 114 of the emitter 112 form collimators for the particles emitted. The emitter 112 is placed at a negative potential with respect to ground by means of the voltage source 116. At the opposite end of the container 111 from the emitter 112 are a pair of plates 117 and 118 equally spaced and parallel to the emitting surface coating 113 of the emitter 112. The plates 117 and 118 are spaced from each other on either side of an imaginary plane (not shown) containing the central axis 119 drawn normally to the emitter surface 113 at a midpoint therein, said plane being parallel to the collimators 115. To establish a potential gradient the plates 117 and 118 are kept at equally positive potentials with respect to emitter 112 through their respective resistors 120 and 121 and ground 122. A grounded plate 123 is disposed between the plates 117 and 118 and lying in the imaginary plane so as to separate the signals on each plate and shield the two plates 117 and 118 from interelectrode capacitances between them. A U-shaped coil 124 is disposed between the emitter 112 and the plates 117 and 118 having its opposite poles 125 and 126 opposite each other on either side of the central axis 119 so that the lines of flux between the poles 125 and 126 will be essentially parallel to the collimators 115. It is to be noted that the U-shaped coil 124 may be located outside of the container 111, as pictured in Figure 2 as long as the flux field will permeate the material of which the container 111 is made, such as aluminum, or may be disposed within the container if preferred. The coil ends are connected to opposite sides of an alternating voltage source 127 so that the magnetic field created between the ends of the poles 125 and 126 periodically changes in direction.

An amplifier 128 is connected to the output represented by the resistors 120 and 121 similar to the first embodiment in Figure 1. The output across the common load resistor 129 of the amplifier is fed into a filter 130 tuned to approximately twice the frequency of the alternating voltage source 127 connected to the U-shaped coil 124. A recorder 131 is connected to the output of the filter to measure the magnitude of the signals passed by the filter.

The operation is similar to that in the embodiment of Figure 1 to measure a thermal neutron flux in that the neutrons bombarding the surface 113 of the emitter 112 produce particles most of which are emitted essentially horizontal because of the collimators 115. The particles strike molecules of the gas causing ionization along their path, the positive potential on the collector plates 117 and 118 causing the negatively charged masses, such as electrons, ions and charged particles, to accelerate towards the collector plates through a magnetic field set up between the ends of the poles 125 and 126 of the U-shaped coil 124. The alternating voltage applied to the U-shaped coil 124 causes the magnetic field to periodically change direction, so that in one assumed increment of time corresponding to the first half of a cycle of the applied alternating voltage, the negative particles or ions are deflected toward the collector plate 117 causing a negative charge signal thereon. This negative charge will cause a current to flow from ground through resistor 120 to the plate 117. The voltage across resistor 120 will be amplified by the amplifier 128 as a positive signal across the common load resistor 129. In a later increment of time corresponding to the second half of the cycle of the alternating voltage source 127, the negatively charged masses will be deflected downward toward the collector plate 118 causing a current to flow from ground through resistor 121 to the plate 118. The voltage signal across resistor 121 will be amplified by the amplifier 128 as a positive signal across a common load resistor 129.

Since there are two positive pulses across the common load resistor 129 per one cycle of the alternating voltage source 127, a signal having a fundamental frequency double that of the voltage source 127 is fed into the filter 130. The filter 130 being tuned to twice the frequency of the alternating voltage source 127 filters out any noise voltages and transmits the signal to the recorder 131. The recorder 131 measures the magnitude of the pulse which is a function of the intensity of the thermal neutron flux in the neutron sensor. A screen such as the screen 23 in the embodiment in Figure 1 is not necessary since no interelectrode capacities appear between the deflection plates 117 and 118 and the deflection means represented by the pole ends 124 and 125.

From the foregoing disclosure, a man skilled in the art will readily devise many other devices and modifications similar in nature to those disclosed herein. It is intended that the scope of the present invention not be limited to the specific devices herein disclosed, but rather, only by the appended claims.

What is claimed is:

1. A neutron measuring device comprising a gas-tight container, means including a mass of material emitting particles responsive to neutron bombardment disposed within the container, gas ionizable by said particles disposed within the container, a pair of plates spaced from the emitting means for collecting negatively charged masses produced by ionization, a screen disposed between the emitter and the collector plates, a potential source connected to the screen to cause the negatively charged masses to flow to the collector plates, an alternating voltage source, a pair of parallel plates parallel to and adjacent to the charged mass path, each of said plates being connected to opposite polarities of the alternating voltage source, whereby said negatively charged masses are alternately deflected to each collector plate.

2. A neutron measuring device comprising a gas-tight container, means including a mass of material emitting particles responsive to neutron bombardment disposed within the container, gas ionizable by said particles disposed within the container, a pair of plates adjacent to each other and equally spaced from said source for collecting negatively charged masses produced by ionization of said gas, means for causing said masses to flow to the collector plates, said plates disposed perpendicular to the mass flow, a third plate between and perpendicular to said pair of plates and parallel to said flow of masses, said pair of plates and said third plate being of positive potential with respect to said source of masses, an alternating voltage source, deflecting means connected to opposite sides of the alternating voltage source for deflecting said masses alternately to each plate producing signals thereof, said signals being equal in frequency to the alternating voltage on said deflection means but opposite in phase to each other, and means for algebraically adding said two signals to obtain a combined signal having a fundamental frequency double that of the frequency of the alternating voltage on said deflection plates.

3. A neutron measuring device comprising the elements of claim 2 in combination with means for discriminating between the frequency of said combined signal and the frequency of the alternating voltage whereby the amplitude of the combined signal is a function of the density of thermal neutrons present.

4. A neutron measuring device as described in claim 2 wherein said deflecting means comprises a pair of parallel plates parallel to and adjacent to the negative masses path, each of said plates being connected to opposite polarities of the alternating voltage source.

5. A neutron measuring device as described in claim 2 wherein said deflecting means comprises a U-shaped coil connected across the alternating voltage source and having the ends of its poles on opposite sides of the negative masses path.

6. A neutron measuring device comprising a gas-tight container, means including a material emitting particles responsive to neutron bombardment within the container, a gas ionizable by said particles within said container, a pair of electrodes adjacent to each other and equally spaced from the particle emitting means for collecting negatively charged masses produced by ionization of said gas, means to cause the masses to flow to the collector electrodes, an alternating voltage source, a U-shaped coil connected across the alternating voltage source having the ends of its poles on opposite sides of the negative masses path and adapted to periodically deflect said masses for alternate impingement thereto on said collector electrodes.

7. A neutron measuring device comprising a gas-tight container, a U-shaped emitter having leg portions extending parallel to the axis of said container and a flat surface between said leg portions perpendicular to the axis of said container, said emitter located at one end of said container with its leg portions extending toward the center thereof; a plurality of collimator plates extending from said surface parallel to said leg portions, a coating containing boron 10 disposed on said surface between each of said collimator plates and said leg portions; a gas comprising argon with 1–10% nitrogen in mixture therewith at a pressure of approximately one atmosphere disposed within said container; a pair of plates adjacent to each other and equally spaced from said emitter at the opposite end of said container for collecting negatively charged masses produced by ionization of said gas, said plates disposed perpendicular to the mass flow, means for causing said masses to flow to the collector plates, a third plate between and perpendicular to said pair of plates and parallel to the flow of masses; an alternating voltage source, deflecting means connected to opposite sides of the alternating voltage source for deflecting said masses alternately to each of said pair of plates producing signals thereon, a first resistor connected between one of said pair of plates and ground, a second resistor connected between the other of said pair of plates and ground, a voltage source having its negative terminal connected to said emitter and its positive terminal connected to ground; an adder circuit having two inputs each of which is connected to one of said pair of plates, the output of said adder circuit connected to a filter circuit for eliminating portions of the added signal having the same frequency as said alternating voltage source, the output of said filter circuit being a function of the number of thermal neutrons striking said boron coating.

8. A neutron measuring device as described in claim 7 wherein said deflecting means comprises a pair of parallel plates parallel and adjacent to the path of the masses and parallel to said collimator plates, each of said plates being connected to opposite polarities of the alternating voltage source.

9. A neutron measuring device as described in claim 7 wherein said deflecting means comprises a U-shaped coil connected across the alternating voltage source, the ends of the coil poles positioned on opposite sides of the negative mass path.

References Cited in the file of this patent
UNITED STATES PATENTS

| | | |
|---|---|---|
| 2,587,555 | Weiss | Feb. 26, 1952 |
| 2,659,822 | Lee | Nov. 17, 1953 |
| 2,795,704 | Bryant et al. | June 11, 1957 |